United States Patent [19]
Collentro et al.

[11] Patent Number: 5,670,053
[45] Date of Patent: Sep. 23, 1997

[54] PURIFICATION OF GASES FROM WATER USING REVERSE OSMOSIS

[75] Inventors: William V. Collentro, New Hope, Pa.; Andrew W. Collentro, Newton, Mass.

[73] Assignee: Zenon Environmental, Inc., Burlington, Canada

[21] Appl. No.: 512,108

[22] Filed: Aug. 7, 1995

[51] Int. Cl.$^6$ ................................. B01D 61/00
[52] U.S. Cl. .................. 210/652; 210/651; 210/653; 210/900; 95/43; 95/45; 95/46; 95/47; 95/51
[58] Field of Search .................... 210/652, 651, 210/653, 900, 257.2; 95/43, 45, 46, 47, 51

[56] References Cited

U.S. PATENT DOCUMENTS

| | | | |
|---|---|---|---|
| 3,774,763 | 11/1973 | Yall et al. | 219/96 |
| 3,776,842 | 12/1973 | Grimme, Jr. | |
| 3,823,086 | 7/1974 | Schmidt | |
| 4,014,787 | 3/1977 | Shorr | 210/651 |
| 4,046,685 | 9/1977 | Bray | 210/652 |
| 4,115,274 | 9/1978 | Boddeker et al. | 210/346 |
| 4,160,727 | 7/1979 | Harris | 210/97 |
| 4,188,291 | 2/1980 | Anderson | 203/26 |
| 4,243,523 | 1/1981 | Pelmulder | 210/652 |
| 4,255,263 | 3/1981 | Galimi et al. | |
| 4,261,833 | 4/1981 | Pohl et al. | 210/639 |
| 4,277,336 | 7/1981 | Henschel, Jr. | 210/167 |
| 4,289,617 | 9/1981 | Davis | 210/109 |
| 4,313,830 | 2/1982 | Tulin et al. | 210/639 |
| 4,332,685 | 6/1982 | Nowlin et al. | 210/638 |
| 4,434,057 | 2/1984 | Marquardt | 210/638 |
| 4,495,067 | 1/1985 | Klein et al. | 210/900 |
| 4,574,049 | 3/1986 | Pittner | 210/639 |

(List continued on next page.)

FOREIGN PATENT DOCUMENTS

| | | |
|---|---|---|
| 22802 | 6/1988 | Japan. |
| 1245893 | 10/1988 | Japan ................. 210/900 |
| 422490 | 5/1990 | Japan. |
| 4176303 | 6/1992 | Japan. |

OTHER PUBLICATIONS

R. Rautenbach et al., "Separation Potential of Nano Filtration Membranes", Dessalination, 77 (1990) 73–84, Elsevier Sc. Publishing.

Tai et al, "Removal of Dissolved Oxygen in Ultrapure Water Production Using Microporous Membrane Modules", J. Membrane Sci. 37 (1994) 99–105.

Primary Examiner—Ana Fortuna
Attorney, Agent, or Firm—Andrew Alexander

[57] ABSTRACT

A process for purifying water including removing cations, anions and carbon dioxide and/or ammonia from water feed stream to produce high purity water having a resistivity of greater than 1 megohm-era comprising the steps of providing a water feed stream to be purified, the stream containing cations, anions and carbon dioxide and/or ammonia; introducing the water feed stream to a high pressure side of a first reverse osmosis membrane module; passing water through the first reverse osmosis membrane to provide a first retentate having cations and anions concentrated therein and a first permeate depleted in cations and anions and containing carbon dioxide and/or ammonia; adding the first permeate to a high pressure side, of a gas permeable hydrophobic membrane module; passing carbon dioxide and/or ammonia through the gas-permeable membrane from the first permeate in the high pressure side of the gas-permeable hydrophobic membrane to provide a carbon dioxide and/or ammonia permeate on a low pressure side of the hydrophobic membrane and to provide a carbon dioxide and/or ammonia depleted retentate thereby removing carbon dioxide and/or ammonia from the first permeate; transferring the carbon dioxide and/or ammonia depleted retentate to the high pressure side of a second reverse osmosis membrane; and further purifying the carbon dioxide and/or ammonia depleted retentate by passing at least a portion thereof through the second reverse osmosis membrane to provide a second retentate and a second permeate, the second permeate having low levels of carbon dioxide and/or ammonia and having a resistivity greater than 1 megohm-cm.

21 Claims, 1 Drawing Sheet

HYBRID TWO-PASS REVERSE OSMOSIS SYSTEM

U.S. PATENT DOCUMENTS

| | | | |
|---|---|---|---|
| 4,897,091 | 1/1990 | Pasternak et al. | 210/640 |
| 5,073,268 | 12/1991 | Saito et al. | 210/900 |
| 5,078,755 | 1/1992 | Tozawa et al. | |
| 5,091,080 | 2/1992 | Van Eikeren et al. | 95/46 |
| 5,106,754 | 4/1992 | Steele et al. | |
| 5,116,507 | 5/1992 | Ebbins et al. | 210/639 |
| 5,250,183 | 10/1993 | Sawada et al. | 210/652 |
| 5,254,143 | 10/1993 | Anazawa et al. | 95/46 |
| 5,306,427 | 4/1994 | Xu | 210/640 |
| 5,338,456 | 8/1994 | Stivers | 210/652 |
| 5,413,763 | 5/1995 | Jeffers | 210/758 |

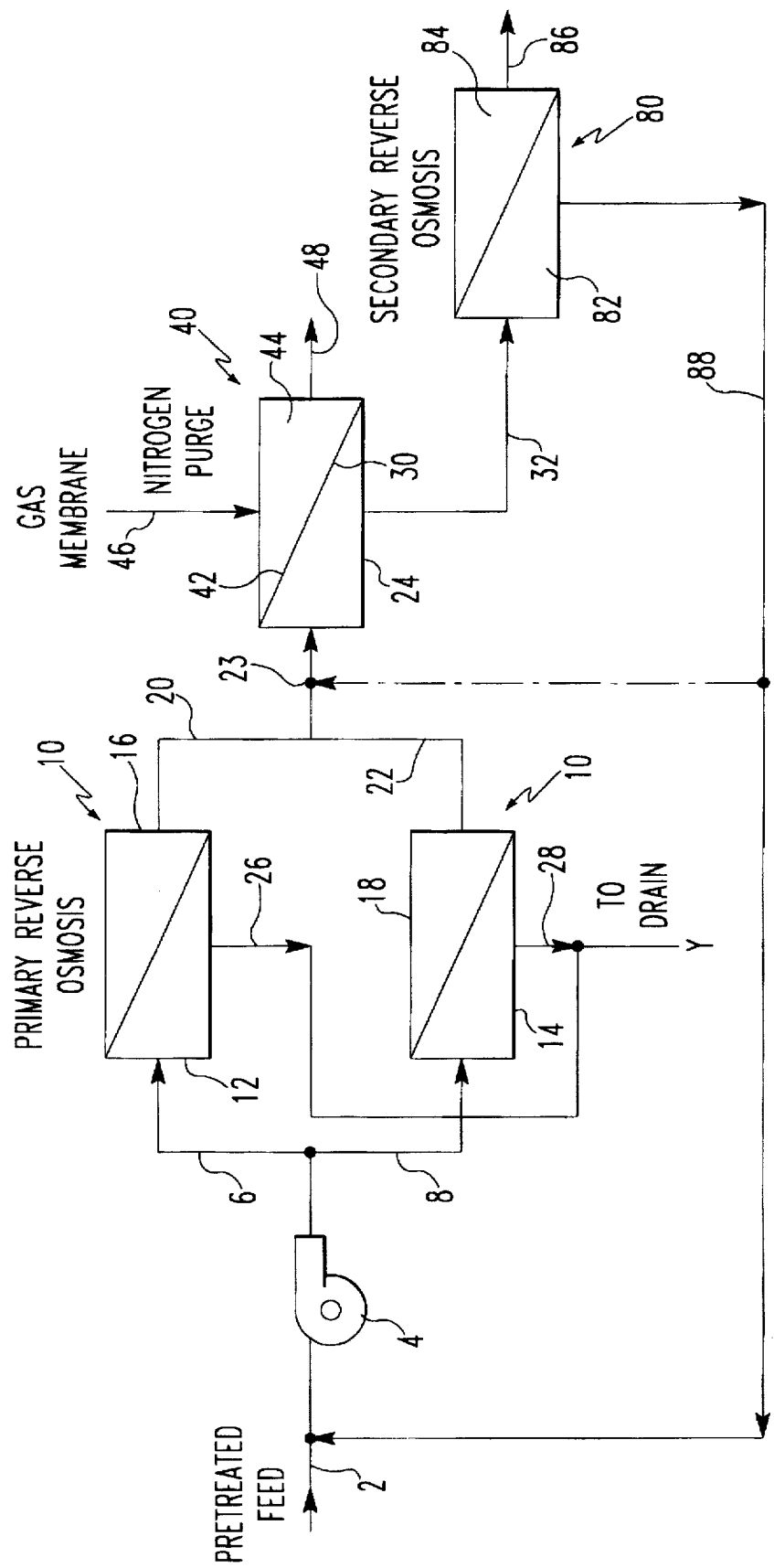

PURIFICATION OF GASES FROM WATER USING REVERSE OSMOSIS

BACKGROUND OF THE INVENTION

This invention relates to water purification and more particularly, it relates to purification of water to remove materials or reactive gases such as carbon dioxide and/or ammonia using reverse osmosis membranes.

The presence of carbon dioxide in water greatly limits the ability to produce high purity water. Even the ability of a double pass reverse osmosis unit to produce high purity water (greater than 1 megohm-era resistivity) is greatly limited by the presence of carbon dioxide.

Carbon dioxide reacts with water in an equilibrium reaction with associated ionization constant, producing hydronium ions and bicarbonate ions. For many water supplies, the percentage of bicarbonate (generally measured and expressed as "methyl orange" alkalinity) is a relatively high percentage of the anions present. This is particularly true as the total dissolved solid level increases. For river water and ground water supplies, the bicarbonate ion is generally a significant percentage of the total anions. The amount of carbon dioxide related to the bicarbonate ion is a direct function of the pH value because lower pH values are associated with a higher concentration of the hydronium ion, with resulting higher concentrations of carbon dioxide.

Carbon dioxide is difficult to remove from water. For example, carbon dioxide, as a gas, passes directly through a conventional brackish water reverse osmosis membrane used in conventional double pass, product staged reverse osmosis units. It is believed that there is insufficient time while passing through the membranes, for equilibrium to re-establish. Unlike the relatively slow ion exchange process which will remove carbon dioxide as the bicarbonate ion, reverse osmosis membranes will not. As a result, the product water purity from a double pass product stage reverse osmosis unit is dependent on the carbon dioxide concentration in the feedwater. The carbon dioxide will pass through the reverse osmosis system and re-establish an equilibrium in the product water, decreasing the resistivity. It should be noted that the product water resistivity can vary from 50,000 ohms-cm to values greater than 4-5 megohm-era by increasing the pH of the feedwater from a value of 6.0 to 9.0.

Attempts at removing carbon dioxide in the past have only been partially successful and often end up further contaminating the water. For example, U.S. Pat. No. 4,574,049 discloses a process for removing carbon dioxide and other impurities from a water supply using double pass reverse osmosis membranes. The process includes providing a first reverse osmosis until having an inlet, a product outlet and a brine outlet; providing a second reverse osmosis unit having an inlet, a product outlet and a brine outlet; locating the second reverse osmosis unit downstream of the first reverse osmosis unit with the product outlet of the first reverse osmosis unit being coupled to the inlet of second reverse osmosis unit; providing water to be purified to the inlet of first reverse osmosis unit; treating the product from the reverse osmosis unit at a location upstream of second reverse osmosis unit with a chemical treatment agent comprising a solution having a pH that exceeds 7 to reduce carbon dioxide concentration of the product by chemical conversion and to ionize certain otherwise difficult to remove chemicals; and directing the product from second reverse osmosis unit toward a point of use or storage for purified water.

However, this process which normally uses sodium hydroxide for increasing the pH results in the addition of sodium which, because of its small ionic radius, is difficult to remove by subsequent membranes. Further, the addition of sodium hydroxide has another disadvantage in that the series of reactions removing carbon dioxide are relatively slow when compared to reverse osmosis unit contact time. Thus, the effectiveness of the operation is limited by the sodium hydroxide reactions.

U.S. Pat. No. 5,338,456 discloses a water purification process for removing dissolved solids of the type that are normally present in a municipal or similar water supply. The process uses a forced draft decarbonator having an inlet and a product outlet, a vacuum degasifier having an inlet, a product outlet and a water level sensor, and a reverse osmosis unit having an inlet, a product outlet and a brine outlet. Preferably, the vacuum degasifier is located downstream of the forced draft decarbonator with the product outlet of the forced draft decarbonator being coupled to the inlet of the vacuum degasifier. The reverse osmosis unit is located downstream of the vacuum degasifier with the product outlet of the vacuum degasifier being coupled to the inlet of the reverse osmosis unit. Water to be purified is provided to the inlet of the forced & aft decarbonator at a predetermined rate. According to the invention, the rate at which water to be purified is provided to the inlet of the forced draft decarbonator is a function of a predetermined water level in the vacuum degasifier.

Japanese Patent 4-22490 discloses a pre-stage reverse osmosis membrane module, a post-stage reverse osmosis membrane module and a hydrophobic porous membrane module, to which an aqueous alkali solution circulating line is attached in the permeate side. That is, Japanese Patent 4-22490 utilizes an alkali solution in the permeate side to remove dissolved carbon dioxide by chemical reaction. The hydrophobic porous membrane module is placed between the pre-stage module and the post-stage module and has pores capable of permeating only gases. An inert gas blowing pipe is installed to the alkali aqueous solution circulating line.

Japanese Patent 2-2802 discloses reverse osmosis separator membrane module and degassing membrane module arranged in treating water line in series. The degassing membrane is formed by a porous supporter layer and high molecular homogeneous layer or minute layer arranged on the supportor layer. Oxygen separating. coefficient of the degassing membrane is not less than 1.3.

U.S. Pat. No. 4,897,091 discloses that gases such as carbon dioxide may be separated from rich liquor (such as methanol containing carbon dioxide) by passage of gas through a membrane which is the reaction product of (i) a polyamine and (ii) a polyisocyanate or a poly (carbonyl chloride).

U.S. Pat. No. 5,078,755 discloses removing dissolved gas from liquid, which comprises bringing the liquid containing the gas dissolved therein into contact with a membrane, thereby causing the dissolved gas to selectively permeate the membrane. The membrane is a permselective, composite membrane composed of a porous support and a nonporous, active membrane of a synthetic resin formed on the porous support, or is a permeable membrane having such characteristics that the nitrogen gas permeation rate at 30° C. is in the range from $7 \times 10^4$ to $2 \times 10^2$ $Nm^3m^2 \cdot h \cdot atom$ and that the amount of permeated stream is 100 $g/m^2 \cdot h$ or less when 20° C. water is supplied to the membrane under atmospheric pressure while maintaining the pressure on its permeate side at 40 mm Hg.

U.S. Pat. No. 5,106,754 discloses that total organic carbon (TOC) and total inorganic carbon (TIC) monitoring of water is useful in determining the water quality. Conventional TOC and TIC monitoring techniques are not zero gravity compatible. The addition of microporous hydrophobic bladders in combination with a non-dispersive infrared analyzer allow for a two-phase, liquid and gas, zero gravity compatible TOC monitoring technique.

U.S. Pat. No. 5,116,507 discloses a method of treating an aqueous liquor, such as effluent liquor formed during coal gasification. The method comprises subjecting the liquor to dephenolation and ammonia stripping treatment to remove phenolic compounds and "free" ammonia from the liquor and then subjecting the resulting liquor, which still contains ammonium compounds and thus "fixed" ammonia, to reverse osmosis treatment to produce a permeate which is substantially free from impurities, including fixed ammonia.

U.S. Pat. No. 5,250,183 discloses an apparatus for manufacturing ultra-pure water, characterized in that a decarbonator/degassor and a reverse osmosis equipment for pretreatment of supply water are installed in the upper stream of a multiple effect evaporator.

U.S. Pat. No. 5,254,143 discloses a diaphragm for gas-liquid contact comprising a membrane having two surfaces, at least one surface of the membrane is hydrophilic and surfaces of micropores present in the membrane are hydrophobic. The diaphragm is used in contact apparatus in which a liquid is contacted with the hydrophilic surface of the membrane and a gas is contacted with the other surface.

U.S. Pat. No. 5,306,427 discloses a process for the separation of one or more, more permeable components from one or more, less permeable components in a feed stream. The process suggests two membrane separation stages in series wherein the feed is introduced into the low pressure side of the first stage, the permeate stream from the first stage is compressed and introduced into the high pressure side of the second stage and wherein the non-permeate stream from the second stage is recycled to the high pressure side of the first stage.

U.S. Pat. No. 5,413,763 discloses a method and apparatus for the measurement of the total organic carbon (TOC) content of a liquid. The inorganic carbon in the liquid is converted into carbon dioxide and removed from it. At the same time, oxygen is added to the liquid. The liquid is then exposed to ultraviolet radiation and the organic carbon thereby oxidized.

Japanese Patent 4-176303 discloses a gas-permeable membrane module containing a hollow fiber-shaped hydrophobic gas-permeable membrane used to remove the gas dissolved in a liquid. The liquid is supplied from an inlet, passed through the inside of the membrane from the membrane opening and sent to the other end of the membrane. A carrier gas is introduced from an outlet, passed around the bundle of the membranes and discharged from an outlet. The outlet is connected under these conditions to a vacuum source such as a vacuum pump, hence the gas dissolved in the liquid permeates through the membrane to the outside, and degasification is performed with high efficiency.

It will be seen that in spite of these disclosures, there is still a great need for a process that permits economical and efficient removal of carbon dioxide to a very low level from water without further contamination to provide high pretty water useful for pharmaceutical uses, for example.

SUMMARY OF THE INVENTION

It is an object of the invention to provide a process for producing high purity water.

It is another object of the invention to provide an improved process for removing carbon dioxide from water.

Yet, it is another object of the invention to provide a process utilizing reverse osmosis membranes for removing carbon dioxide and other impurities from water.

Still, it is another object of this invention to provide at least one reverse osmosis membrane and a gas-liquid separation membrane to provide purified water having depleted levels of carbon dioxide, all of which may be maintained at the pressure in the high pressure side of the reverse osmosis membrane.

And still, it is another object of this invention to provide double pass reverse osmosis membranes having a gas-liquid separation membrane therebetween to remove carbon dioxide from water to provide high purity water having a resistivity of greater than 1 megohm-cm.

Still further, it is an object of the present invention to provide a gas-liquid separation membrane between two reverse osmosis membrane units wherein the high pressure side of the gas-liquid separation is maintained at the same pressure as the high pressure side of the reverse osmosis membranes.

And yet, it is still another object of the invention to provide double pass reverse osmosis membranes in combination with a gas-liquid separation membrane positioned before or after the reverse osmosis membranes to provide high purity water having depleted levels of carbon dioxide.

These and other objects will be apparent from the specification, claims and drawings appended hereto.

In accordance with these objects, there is provided a process for purifying water including removing cations, anions and carbon dioxide from water feed stream to produce high purity water having a resistivity of greater than 1 megohm-cm, comprising the steps of providing a water feed stream to be purified, the stream containing cations, anions and carbon dioxide; introducing the water feed stream to a high pressure side of a first reverse osmosis membrane module; passing water through the first reverse osmosis membrane to provide a first retentate having cations and anions concentrated therein and a first permeate depleted in cations and anions and containing carbon dioxide; passing the first permeate to a high pressure side of a gas permeable hydrophobic membrane module or gas-liquid separation membrane module; passing carbon dioxide through the gas-permeable membrane from the first permeate in the high pressure side of the gas-permeable hydrophobic membrane to provide a carbon dioxide permeate on a low pressure side of the hydrophobic membrane and to provide a carbon dioxide depleted retentate on the high pressure side of the hydrophobic membrane, thereby removing carbon dioxide from the first permeate; transferring the carbon dioxide depleted retentate to the high pressure side of a second reverse osmosis membrane; and further purifying the carbon dioxide depleted retentate by passing at least a portion thereof through the second reverse osmosis membrane to provide a second retentate and a second permeate, the second permeate having low levels of carbon dioxide and having a resistivity of greater than 1 megohm-cm.

BRIEF DESCRIPTION OF THE FIGURE

The Figure is a schematic representation of the process of the invention showing the gas permeable hydrophobic membrane positioned between first and second reverse osmosis operations.

DETAILED DESCRIPTION OF THE PREFERRED EMBODIMENTS

In the Figure, there is shown a process for removing $CO_2$ and/or $NH_3$ using at least one primary reverse osmosis membrane 10, a gas permeable, hydrophobic membrane unit 40 and a secondary reverse osmosis membrane 80. Feed stock to be purified in accordance with the invention is introduced along line 2, where high pressure pump 4 pumps feedwater along lines 6 and 8 to the high pressure sides 12 and 14 of primary reverse osmosis units 10. Permeate from low pressure sides of reverse osmosis units 10 is removed along lines 20 and 22 and transferred along line 23 to the high pressure side 24 of gas permeable, hydrophobic membrane unit 40. Retentate from units 10 is removed along lines 26 and 28 and may be disposed of as necessary. Gas permeable, hydrophobic membrane unit 40 comprises a membrane 30 which is hydrophobic and is permeable by $CO_2$ or $NH_3$ gas contained in the permeate from modules 10. Retentate depleted in $CO_2$ and/or $NH_3$ in the high pressure side of gas permeable, hydrophobic membrane unit 40 is transferred along line 32 to high pressure 82 side of second reverse osmosis unit 80 where it is subjected to another purification step to provide high purity water as permeate in low pressure side 84 which is removed along line 86. Retentate from high pressure side 82 can be transferred along line 88 and re-introduced to line 2 to the high pressure side of primary reverse osmosis units 10 or to gas-permeable hydrophobic membrane unit 40. By use of "hydrophobic membrane" as used herein is meant to include a microporous gas-liquid separation type membrane which will permit passage of gas therethrough but not the passage of liquid.

The feedwater which can be purified to high levels of purity in the present invention can include river water, surface water and water from reservoirs and lakes, for example. In many instances, it is preferred to soften such water prior to introducing it to the primary reverse osmosis step. Generally, these sources of water contain magnesium, calcium, sodium, potassium, barium, aluminum and strontium cations with the magnesium and calcium usually being present at higher levels, depending on the source. Usually, ground water supplies contain calcium and magnesium as the primary cations and bicarbonate (with associated carbon dioxide) and sulfate as the primary anions. Sodium and chloride levels are usually less than 20 to 25% of the total cation and anion concentrations.

Because of the presence of scale frowning cations, such as magnesium and calcium, membrane scaling can occur in the primary, reverse osmosis module 10. Thus, for purposes of the invention, it is preferred to pretreat the feedwater to remove the scale forming cations. Conventionally, such pretreatments include water softening. However, this has the disadvantage that large quantities of salt are required for regeneration of the softener. Thus, for purposes of the present invention, pretreatment of the feedwater utilizing a softening or nanofiltration membrane is also acceptable. The nanofiltration membrane operates at about ¼ to ⅓ the pressure (e.g., 60 to 120 psig) required for a reverse osmosis membrane used for purifying brackish water. Thus, nanofiltration can be used for pretreatment of the feedwater to remove scale framing precipitates, colloidal or organic material which would operate to foul the primary reverse osmosis membrane. The nanofiltration membrane is effective in removing up to about 80% of the large ionic radius ions and radicals, such as calcium, magnesium, sulfate and to a lesser extent, bicarbonate. Sodium and chloride ions, because of their small ionic radius, are not effectively removed (about 20 to 40% by nanofiltration). Thus, if caustic is used to adjust the pH of the feedwater, water softening which removes sodium ions may be used, with or without nanofiltration. Thus, the use of nanofiltration as a pretreatment has the advantage over conventional softening of not requiring the use of large quantities of regenerant salt or the disposal of regenerant waste solutions. Further, the use of nanofiltration as a pretreatment has the advantage that fouled nanofiltration membranes are much easier to clean when compared to conventional reverse osmosis membranes.

Nanofiltration membrane useful in the present invention are available from Filmtec, a division of Dow Chemical Company under the designation NF-40 or NF-70. Typically, nanofiltration membranes useful in the invention have a pore size in the range of 0.005 to 0.05 μm, and preferably 0.008 to 0.02 μm. Thus, in the present invention, nanofiltration is preferred for pretreatment of feedwater having a total dissolved solids of 200 ppm or greater and high percent hardness, e.g., 75% or greater, due to cations such as calcium and magnesium ions. The nanofiltration operates to remove 60 to 90% of the scale-framing precipitates.

The pretreated feedwater where substantial hardness and foulants have been removed, as noted, is then conveyed to the first or primary reverse osmosis module 10. It should be noted that the ability of a double pass reverse osmosis module to produce high quality water, e.g., greater than 1 megohm-cm resistivity, is significantly limited by the presence of carbon dioxide. Carbon dioxide reacts with water, in an equilibrium reaction with associated ionization constant, producing the hydronium ion and the bicarbonate ion. Usually, the percentage of bicarbonate (generally measured and expressed as methyl orange alkalinity) is a relatively high percentage, e.g., 40 to 70% of the anions present, particularly as the TDS level increases. The mount of carbon dioxide related to the bicarbonate ion is a direct function of the pH. Lower pH values indicate a higher concentration of hydronium ion, with resulting higher concentrations of carbon dioxide.

Carbon dioxide, as a gas, passes directly through a conventional brackish water reverse osmosis membrane used in a double pass, product staged reverse osmosis unit. Unlike the relatively slow ion exchange process which will remove carbon dioxide as the bicarbonate ion, reverse osmosis membranes will not. As a result, the product water purity from a double pass product stage reverse osmosis unit is significantly dependent on the carbon dioxide concentration in the feedwater, thereby decreasing the resistivity. The product water resistivity can vary from 50,000 ohms-era to values greater than 4–5 megohm-era by increasing the pH of the feedwater from a value of 6.0 to 9.0. Increasing the pH of the feedwater containing high TDS values (generally reflecting high calcium, magnesium and sulfate values) will result in precipitation of scale framing compounds within the channels of the reverse osmosis membranes. However, in the present invention, it is not required to increase the pH. Thus, carbon dioxide and/or ammonia can be removed at lower pH values, e.g., pH in the range of 5 to 8 and typically 5.5 to 7.5.

In the present invention, the primary reverse osmosis units 10 are utilized primarily for removing up to about 90 to 95% of the ionic material, e.g., sodium, chloride, sulfate and bicarbonate ions remaining after the nanofiltration step. However, ions having a small ion radius, such as sodium and chloride, are less effectively removed by the primary reverse osmosis membrane. Carbon dioxide and ammonia are not removed. Typically, the TDS in the feedwater introduced to the primary reverse osmosis membrane is in the range of 20 to 500 ppm, carbon dioxide can be in the range of 10 to 300 ppm, and ammonia in the range of about 0 ppm to 5 ppm. Further, typically in the present invention, the feedwater is maintained at a pH less than 8 and typically in the range of 5 to 8 for purposes of removing $CO_2$. Carbon dioxide is more prevalent in the lower pH range, e.g., 5 to 8, when the bicarbonate ion is also present. At higher pH values greater than 8, e.g., 8 to 10, ammonia becomes significant compared to the ammonium ion. Thus, the pH can be adjusted before the first reverse osmosis pass, between reverse osmosis passes, or after the second reverse osmosis pass to remove either the $CO_2$ and/or the $NH_3$.

Membranes suitable for primary reverse osmosis module 10 are available from Filmtec, a division of Dow Chemical Company under the tradename BW30-4040. Such membranes have a pore size in the range of about 0.0001 to 0.002 μm.

After subjecting the feedwater to purification in the primary reverse osmosis unit 10, permeate therefrom has a TDS of normally not greater than 25 ppm, with typical TDS being in the range of 5 to 20 ppm. Further, typically 70 to 90% of the ions in the permeate leaving module 10 are sodium, chloride and bicarbonate.

In accordance with the invention, permeate from primary reverse osmosis units 10 is introduced to the high pressure side 24 of gas-liquid separation module 40. In gas-liquid separation module 40, a membrane 42 is provided for separating gases such as carbon dioxide and/or ammonia from the water. Membrane 42 is a hydrophobic membrane permeable by gases such as carbon dioxide and/or ammonia. That is, carbon dioxide and/or ammonia pass through the hydrophobic membrane and in this way are separated from liquid in high pressure side 24.

Because the rate of removal of carbon dioxide and/or ammonia through the membrane is dependent on the rate of migration of the carbon dioxide or ammonia to the membrane surface pores, it is preferred that liquid baffling or mixing action be applied to liquid in high pressure side 24 to continually provide or contact membrane surface pores with new or fresh liquid. Additionally, an inert gas sparge (e.g., argon) may be applied to provide mixing. The inert gas may be removed through the hydrophobic membrane carrying with it carbon dioxide or ammonia occluded therewith.

For purposes of removing carbon dioxide or ammonia that has permeated membrane 42, a nitrogen purge or sweep that removes carbon dioxide or ammonia from the sin-face of membrane 42 in low pressure side 44 may be employed. It should be understood that permeate side or low pressure side 44 of membrane 42 is free of liquid and thus permits a gas purge. Liquid on the permeate side is harmful to the present invention because it can interfere with the hydrophobicity characteristics of membrane 42. Another disadvantage of maintaining liquid in the low pressure side is the fluctuation or change in pressure. This is particularly hazardous to the life of the membrane. The gas, e.g., nitrogen, purge may be introduced along line 46 and remove along line 48 for purposes of sweeping carbon dioxide or ammonia from the permeate side of the membrane. In the present invention, it is preferred to maintain the pressure in low pressure side 44 at about atmospheric pressure. This has the advantage of greatly extending membrane life.

As a further aid to removing carbon dioxide or ammonia from liquid in high pressure side 24, low pressure side 44 may be subjected to a vacuum. The level of vacuum applied should be just less than that which will remove carbon dioxide or ammonia which has passed through the membrane, increasing the driving force for the removal. That is, vacuum level should be adequate to remove carbon dioxide and/or ammonia gas and yet sufficiently low to avoid pulling water through the microporous gas-liquid membrane. For proposes of design, the membrane is preferred to be located so as to minimize the static pressure or intrusion pressure exerted by the liquid.

Any type of membrane that resists penetration by liquid on the high pressure side and which is permeable by carbon dioxide and/or ammonia may be used for hydrophobic membrane 42. While hydrophobic membranes with high resistance to intrusion pressure are preferred, the membranes should exhibit a porous structure which permits contact with the liquid and passage of gases such as carbon dioxide and/or ammonia. Hydrophobic material is that having a contact angle with water of greater than 90°. Such hydrophobic materials include polyolefins, fluorine resins and chlorine containing resins; silicone resins; polysulfone and polyphenylene sulfide. Materials suitable for the hydrophobic membrane include teflon (polytetro fluoroethylene), polysulfphene, polyethylene and polyvinylidene fluoride. The preferred material for membrane 42 is comprised of teflon and its high resistance to intrusion or permeation by water. By intrusion pressure is meant the pressure to be overcome to force liquid through the membrane. For proposes of the present invention, it is preferred that the hydrophobic membrane have a pore size in the range of 0.05 to 1.5 μm. A support material such as polypropylene may be used for the membrane.

In the method of the invention, carbon dioxide can be reduced from about 20 to 300 ppm to a level of about <1 to 5 ppm. Ammonia can be reduced from about 0.25 ppm to 5 ppm to a level of about <0.1 to 0.5 ppm utilizing the hydrophobic membrane.

For purposes of enhancing removal of $CO_2$ from the permeate from primary reverse osmosis units 10, the pH of the permeate may be adjusted to a pH in the range of about 4.5 to 8, preferably 5 to 7.5, where $CO_2$ gas is more prevalent before being introduced to high pressure side 24 of hydrophobic membrane unit 40 to ensure the highest level of $CO_2$ removal. For proposes of enhancing $NH_3$ removal from the permeate from primary reverse osmosis unit 10, the pH of the permeate may be adjusted to a pH of 8 or greater, e.g., 8 to 11, typically pH in the range of 8 to 10 prior to being introduced to high pressure side 24 of hydrophobic membrane unit 40 to ensure highest removal of $NH_3$. It may be desirable in certain instances to use two hydrophobic membranes in series. That is, the first hydrophobic membrane can have the pH adjusted to maximize the removal of $CO_2$, e.g., pH in the range of 5.5 to 7.5. The second hydrophobic membrane can have the pH of the retentate from the first hydrophobic membrane adjusted upwardly, e.g., pH in the range of 8 to 10, to favor removal of $NH_3$ gas. Thereafter, the pH of the retentate from the second hydrophobic membrane unit may be adjusted to acidic or neutral conditions for feed to second pass reverse osmosis unit 80. The order of removing $CO_2$ and $NH_3$ in separate hydrophobic membrane units may be reversed if the permeate from the first pass reverse osmosis 10 has a basic pH. This avoids a step of pH manipulation.

Any method of adjusting the pH of the liquids in the present invention can be used. However, it is preferred to use a method that introduces the least amount of ions.

In the present invention, for improved efficiency, the process may be performed utilizing a single pump 4 and, thus, the pressure used in high pressure side 24 is the same as in low pressure side 14 of units 10 and high pressure side 82 of secondary reverse osmosis unit 80. Typically, the system is maintained at a pressure in the range of 200 to 800 psig in the high pressure side of the modules.

After carbon dioxide and/or ammonia is removed in unit 40 to the desired level, retentate from high pressure side 24 is then transferred along line 32 to high pressure side 82 of secondary reverse osmosis unit 80 where cations such as sodium and potassium ions and anions such as chloride not removed in primary reverse osmosis unit 10 are removed. A membrane suitable for use in secondary reverse osmosis unit 80 is available from Filmtec, a division of Dow Chemical Company under the designation BW30HR-4040. Such membrane has a pore size <0.001 µm. Normally, secondary reverse osmosis unit 80 removes or rejects >90% of the ions remaining in the liquid. Typically, permeate from secondary reverse osmosis unit 80 will have less than 0.5 ppm TDS and have a resistivity of greater than 1 megohm-era, typically greater than 2 to 4 megohm-era, and a conductivity of less than 1 microsiemens/era, and typically less than 0.25 to 0.5 microsiemens/cm.

It should be noted that this invention is not concerned with $O_2$ separation from water or general gaseous separation from water. The present invention has the advantage that extremely pure water can be obtained, e.g., 2 to 4 megohm-cm resistivity without the addition of chemicals and resultant disposal problems.

Further, the present invention can produce high purity water with a resistivity of greater than 1 megohm-cm without the use of ion exchange. Further, because mixed bed polishing is not required, the high purity water is extremely low in bacterial levels. Because regenerant acid and caustic is not required, the present system does not have waste disposal problems. The present system can produce high purity water meeting the proposed revised specification (chemical) for USP Purified Water having a conductivity of <1.3 microsiemens/cm, total organic carbon <500 ppb, pH=5 to 7. Further, the system can produce pyrogen free (<0.25 Erdotorin units/ml) USP purified water for pharmaceutical and biotech applications. Also, this invention can produce high purity, non-aggressive product water which can be used for feedwater to a distillation unit producing USP water for injection.

While the invention has been described in tenths of preferred embodiments, the claims appended hereto are intended to encompass other embodiments which fall within the spirit of the invention.

What is claimed is:

1. A process for purifying water including removing cations, anions, carbon dioxide and/or ammonia from a water feed stream to produce high purity water having a resistivity of greater than 1 megohm-era, comprising the steps of:
   (a) providing water feed stream to be purified, said stream containing cations, anions, carbon dioxide and/or ammonia;
   (b) pretreating said feed stream by passing said feed stream through a nonofiltration membrane to remove membrane foulants prior to introducing said feed stream to a first reverse osmosis membrane;
   (c) introducing said water feed stream to a high pressure side of a first reverse osmosis membrane module;
   (d) passing water through said first reverse osmosis membrane to provide a first retentate having cations and anions concentrated therein and a first permeate depleted in cations and anions and containing carbon dioxide and/or ammonia;
   (e) passing said first permeate to a high pressure side, of a first gas permeable hydrophobic membrane module, and
   permeating carbon dioxide and/or ammonia through said gas-permeable membrane from said first permeate in the high pressure side of said gas-permeable hydrophobic membrane to provide a carbon dioxide and/or ammonia permeate on a low pressure side of said hydrophobic membrane and to provide a carbon dioxide and/or ammonia depleted retentate thereby removing carbon dioxide and/or ammonia from said first permeate;
   (f) maintaining the low pressure side of said hydrophobic membrane liquid free and subjecting said low pressure side of said hydrophobic membrane to a gas purge to remove carbon dioxide or ammonia that has permeated the hydrophobic membrane; and
   (g) transferring said carbon dioxide and/or ammonia depleted retentate to the high pressure side of a second reverse osmosis membrane, and
   further purifying said carbon dioxide and/or ammonia depleted retentate by passing at least a portion thereof through said second reverse osmosis membrane to provide a second retentate and a second permeate, the second permeate having low levels of carbon dioxide and/or ammonia and having a resistivity of greater than 1 megohm-cm.

2. The method in accordance with claim 1 including maintaining said feed stream at a pH in the range of 4 to 9.5.

3. The method in accordance with claim 1 including maintaining said first permeate added to a high pressure side of said first gas permeable hydrophobic membrane module at a pH in the range of 5 to 8.

4. The method in accordance with claim 1 including concentrating sodium and chlorine ions in said second retentate.

5. The method in accordance with claim 1 wherein said water feed introduced to said first reverse osmosis membrane has a TDS in the range of 10 to 500 ppm and carbon dioxide in the range of 0 to 300 ppm.

6. The method in accordance with claim 1 wherein said carbon dioxide depleted retentate transferred to the high pressure side of said second reverse osmosis membrane has 0 to 300 ppm $CO_2$.

7. The method in accordance with claim 1 wherein said carbon-dioxide depleted retentate transferred to the high pressure side of said second reverse osmosis membrane has a TDS in the range of 5 to 50 ppm comprised of 0 to 100% sodium ions.

8. The method in accordance with claim 1 including rejecting at least 90% of TDS contained in said carbon dioxide depleted retentate by said second reverse osmosis membrane.

9. The method in accordance with claim 1 including maintaining the high pressure side of said gas permeable hydrophobic membrane at a pressure substantially identical to the pressure in the high pressure side of the second reverse osmosis membrane.

10. The method in accordance with claim 1 wherein said low pressure side of said hydrophobic membrane module is maintained at about atmospheric pressure.

11. The method in accordance with claim 1 including maintaining said low pressure said of said hydrophobic membrane module at less than atmospheric to aid in drawing carbon dioxide and/or ammonia through said hydrophobic membrane.

12. The method in accordance with claim 1 including the step of introducing an inert gas to the high pressure side of said hydrophobic membrane to sparge carbon dioxide thereinto for removal through said hydrophobic membrane.

13. The method in accordance with claim 1 including increasing said carbon dioxide and/or ammonia depleted retentate to a pH greater than 8 and introducing said carbon dioxide and/or ammonia depleted retentate to the high pressure side of a second gas permeable membrane and passing ammonia through said second gas permeable membrane to provide a second retentate further depleted in ammonia.

14. A process for purifying water including removing cations, anions, carbon dioxide and/or ammonia from a water feed stream to produce high purity water having a resistivity of greater than 1 megohm-era, comprising the steps of:
   (a) providing water feed stream to be purified, said stream containing cations, anions, carbon dioxide and/or ammonia;
   (b) pretreating said feed stream by passing said feed stream through a nonofiltration membrane to remove membrane foulants prior to introducing said feed stream to a first reverse osmosis membrane;
   (c) introducing said water feed stream to a high pressure side of a first reverse osmosis membrane module;
   (d) passing water through said first reverse osmosis membrane to provide a first retentate having cations and anions concentrated therein and a first permeate depleted in cations and anions and containing carbon dioxide and/or ammonia;
   (e) adjusting the pH of said permeate to a pH in the range of 5.5 to 7.5 to favor removing $CO_2$ gas using a hydrophobic membrane;
   (f) adding said first permeate to a high pressure side, of a first gas permeable hydrophobic membrane module, and
   passing carbon dioxide and/or ammonia through said gas-permeable membrane from said first permeate in the high pressure side of said gas-permeable hydrophobic membrane to provide a carbon dioxide and/or ammonia permeate on a low pressure side of said hydrophobic membrane and to provide a carbon dioxide and/or ammonia depleted retentate thereby removing carbon dioxide and/or ammonia from said first permeate;
   (g) maintaining the low pressure side of said hydrophobic membrane liquid free and subjecting said low pressure side of said hydrophobic membrane to a gas purge to remove carbon dioxide or ammonia that has permeated the hydrophobic membrane; and
   (h) transferring said carbon dioxide and/or ammonia depleted retentate to the high pressure side of a second reverse osmosis membrane, and
   further purifying said carbon dioxide and/or ammonia depleted retentate by passing at least a portion thereof through said second reverse osmosis membrane to provide a second retentate and a second permeate, the second permeate having low levels of carbon dioxide and/or ammonia and having a resistivity of greater than 1 megohm-cm.

15. The method in accordance with claim 14 including maintaining the high pressure side of said gas permeable hydrophobic membrane at a pressure substantially identical to the pressure in the high pressure side of said second reverse osmosis membrane.

16. A process for purifying water including removing cations, anions, carbon dioxide and/or ammonia from a water feed stream to produce high purity water having a resistivity of greater than 1 megohm-era, comprising the steps of:
   (a) providing water feed stream to be purified, said stream containing cations, anions, carbon dioxide and/or ammonia;
   (b) pretreating said feed stream by passing said feed stream through a nonofiltration membrane to remove membrane foulants prior to introducing said feed stream to a first reverse osmosis membrane;
   (c) introducing said water feed stream to a high pressure side of a first reverse osmosis membrane module;
   (d) passing water through said first reverse osmosis membrane to provide a first retentate having cations and anions concentrated therein and a first permeate depleted in cations and anions and containing carbon dioxide and/or ammonia;
   (e) adjusting the pH of said permeate to a pH of greater than 8 to favor removing $NH_3$ gas using a hydrophobic membrane;
   (f) adding said first permeate to a high pressure side, of a gas permeable hydrophobic membrane module, and
   passing carbon dioxide and/or ammonia through said gas-permeable membrane from said first permeate in the high pressure side of said gas-permeable hydrophobic membrane to provide a carbon dioxide and/or ammonia permeate on a low pressure side of said hydrophobic membrane and to provide a carbon dioxide and/or ammonia depleted retentate thereby removing carbon dioxide and/or ammonia from said first permeate;
   (g) maintaining the low pressure side of said hydrophobic membrane liquid free and subjecting said low pressure side of said hydrophobic membrane to a gas purge to remove carbon dioxide or ammonia that has permeated the hydrophobic membrane; and
   (h) transferring said carbon dioxide and/or ammonia depleted retentate to the high pressure side of a second reverse osmosis membrane, and
   further purifying said carbon dioxide and/or ammonia depleted retentate by passing at least a portion thereof through said second reverse osmosis membrane to provide a second retentate and a second permeate, the second permeate having low levels of carbon dioxide and/or ammonia and having a resistivity of greater than 1 megohm-cm.

17. The method in accordance with claim 16 including maintaining the high pressure side of said gas permeable hydrophobic membrane at a pressure substantially identical to the pressure in the high pressure side of said second reverse osmosis membrane.

18. A process for purifying water including removing cations, anions, carbon dioxide and/or ammonia from a water feed stream to produce high purity water having a resistivity of greater than 1 megohm-era, comprising the steps of:
   (a) providing water feed stream to be purified, said stream containing cations, anions, carbon dioxide and/or ammonia;
   (b) introducing said water feed stream to a high pressure side of a first reverse osmosis membrane module;
   (c) passing water through said first reverse osmosis membrane to provide a first retentate having cations and anions concentrated therein and a first permeate depleted in cations and anions and containing carbon dioxide and/or ammonia;
   (d) adjusting the pH of said first permeate to a pH in the range of 5 to 8 to favor removing $CO_2$ gas with a first hydrophobic membrane;

(e) adding said first permeate to a high pressure side, of a first gas permeable hydrophobic membrane module, and passing carbon dioxide and/or ammonia through said first gas-permeable hydrophobic membrane from said first permeate in the high pressure side of said gas-permeable hydrophobic membrane to provide a carbon dioxide and/or ammonia permeate on a low pressure side of said hydrophobic membrane and to provide a second carbon dioxide and/or ammonia depleted retentate thereby removing carbon dioxide and/or ammonia from said first permeate;

(f) adjusting the pH of said carbon dioxide and/or ammonia depleted second retentate to a pH of greater than 8;

(g) introducing said second retentate to the high pressure side of a second gas permeable hydrophobic permeable membrane module, and passing carbon dioxide and/or ammonia through said second gas-permeable hydrophobic membrane from said second retentate in the high pressure side of said second gas-permeable hydrophobic membrane to provide a carbon dioxide and/or ammonia permeate on a low pressure side of said second hydrophobic membrane and to provide a third carbon dioxide and/or ammonia depleted retentate thereby removing carbon dioxide and/or ammonia from said second retentate;

(h) maintaining the low pressure side of said second hydrophobic membrane liquid free;

(i) transferring said third carbon dioxide and/or ammonia depleted retentate to the high pressure side of a second reverse osmosis membrane; and (j) further purifying said third carbon dioxide and/or ammonia depleted retentate by passing at least a portion thereof through said second reverse osmosis membrane to provide a fourth retentate and a second permeate, the second permeate having low levels of carbon dioxide and/or ammonia and having a resistivity of greater than 1 megohm-cm.

19. The method in accordance with claim 18 including maintaining the high pressure sides of said first and second gas permeable hydrophobic membranes at a pressure substantially the same as the high pressure side of said second reverse osmosis membrane.

20. A process for purifying water including removing cations, anions, carbon dioxide and/or ammonia from a water feed stream to produce high purity water having a resistivity of greater than 1 megohm-cm, comprising the steps of:

(a) providing water feed stream to be purified, said stream containing cations, anions, carbon dioxide and/or ammonia;

(b) introducing said water feed stream to a high pressure side of a first reverse osmosis membrane module;

(c) passing water through said first reverse osmosis membrane to provide a first retentate having cations and anions concentrated therein and a first permeate depleted in cations and anions and containing carbon dioxide and/or ammonia;

(d) adjusting the pH of said first permeate to a pH of greater than 8 to favor removing $NH_3$ gas with a first hydrophobic membrane;

(e) adding said first permeate to a high pressure side, of a first gas permeable hydrophobic membrane module, and passing carbon dioxide and/or ammonia through said first gas-permeable hydrophobic membrane from said first permeate in the high pressure side of said gas-permeable hydrophobic membrane to provide an ammonia and/or carbon dioxide permeate on a low pressure side of said hydrophobic membrane and to provide a second carbon dioxide and/or ammonia depleted retentate thereby removing carbon dioxide and/or ammonia from said first permeate;

(f) adjusting the pH of said carbon dioxide and/or ammonia depleted second retentate to a pH in the range of 5 to 8 to favor removing $CO_2$ gas;

(g) introducing said second retentate to the high pressure side of a second gas hydrophobic permeable membrane module;

(h) passing carbon dioxide and/or ammonia through said second gas-permeable hydrophobic membrane from said second retentate in the high pressure side of said second gas-permeable hydrophobic membrane to provide a carbon dioxide and/or ammonia permeate on a low pressure side of said second hydrophobic membrane and to provide a third carbon dioxide and/or ammonia depleted retentate thereby removing carbon dioxide and/or ammonia from said second retentate;

(i) maintaining the low pressure side of said second hydrophobic membrane liquid free;

(j) transferring said third carbon dioxide and/or ammonia depleted retentate to the high pressure side of a second reverse osmosis membrane; and (k) further purifying said third carbon dioxide and/or ammonia depleted retentate by passing at least a portion thereof through said second reverse osmosis membrane to provide a fourth retentate and a second permeate, the second permeate having low levels of carbon dioxide and/or ammonia and having a resistivity of greater than 1 megohm-cm.

21. A process for purifying water including removing cations, anions, carbon dioxide and/or ammonia from a water feed stream to produce high purity water having a resistivity of greater than 1 megohm-cm, comprising the steps of:

(a) providing water feed stream to be purified, said stream containing cations, anions, carbon dioxide and/or ammonia;

(b) pretreating said feed stream by passing said feed stream through a nonofiltration membrane to remove membrane foulants prior to introducing said feed stream to a first reverse osmosis membrane;

(c) introducing said water feed stream to a high pressure side of a first reverse osmosis membrane module;

(d) passing water through said first reverse osmosis membrane to provide a first retentate having cations and anions concentrated therein and a first permeate depleted in cations and anions and containing carbon dioxide and/or ammonia;

(e) passing said first permeate to a high pressure side, of a first gas permeable hydrophobic membrane module, and permeating carbon dioxide and/or ammonia through said gas-permeable membrane from said first permeate in the high pressure side of said gas-permeable hydrophobic membrane to provide a carbon dioxide and/or ammonia permeate on a low pressure side of said hydrophobic membrane and to provide a carbon dioxide and/or ammonia depleted retentate thereby removing carbon dioxide and/or ammonia from said first permeate;

(f) introducing an inert gas to the high pressure side of said hydrophobic membrane to sparge carbon dioxide thereinto for removal through said hydrophobic membrane;

(g) maintaining the low pressure side of said hydrophobic membrane liquid free; and (h) transferring said carbon dioxide and/or ammonia depleted retentate to the high pressure side of a second reverse osmosis membrane, and further purifying said carbon dioxide and/or ammonia depleted retentate by passing at least a portion thereof through said second reverse osmosis membrane to provide a second retentate and a second permeate, the second permeate having low levels of carbon dioxide and/or ammonia and having a resistivity of greater than 1 megohm-cm.

* * * * *